(12) United States Patent
Suzuki et al.

(10) Patent No.: US 6,311,480 B1
(45) Date of Patent: Nov. 6, 2001

(54) EMISSION CONTROL APPARATUS FOR INTERNAL COMBUSTION ENGINE

(75) Inventors: Naoto Suzuki, Fujinomiya; Kenji Katoh, Sunto-gun, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/520,314

(22) Filed: Mar. 7, 2000

(30) Foreign Application Priority Data

Mar. 29, 1999 (JP) .................................................. 11-086237

(51) Int. Cl.$^7$ ....................................................... F01N 3/00
(52) U.S. Cl. ................................ 60/276; 60/277; 60/286; 60/301
(58) Field of Search ............................. 60/274, 277, 286, 60/295, 301, 276; 123/695; 205/781, 784.5, 785

(56) References Cited

U.S. PATENT DOCUMENTS

| | | | |
|---|---|---|---|
| 5,201,802 | * 4/1993 | Hirota et al. | 60/277 |
| 5,209,061 | * 5/1993 | Takeshima | 60/285 |
| 5,412,946 | * 5/1995 | Oshima et al. | 60/276 |
| 5,426,934 | * 6/1995 | Hunt et al. | 60/276 |
| 5,437,153 | 8/1995 | Takeshima et al. | 60/285 |
| 5,564,283 | * 10/1996 | Yano et al. | 60/285 |
| 5,595,060 | 1/1997 | Togai et al. | 60/277 |
| 5,657,625 | 8/1997 | Koga et al. | 60/285 |
| 5,771,686 | * 6/1998 | Pischinger et al. | 60/285 |
| 5,937,639 | * 8/1999 | Sasaki et al. | 60/285 |
| 5,953,907 | * 9/1999 | Kato et al. | 60/277 |
| 6,012,282 | * 1/2000 | Kato et al. | 60/277 |
| 6,148,612 | * 11/2000 | Yamashita et al. | 60/276 |
| 6,228,252 | * 5/2001 | Miyata et al. | 205/781 |

FOREIGN PATENT DOCUMENTS

| | | |
|---|---|---|
| HEI 7-166851 | 6/1995 | (JP) . |
| HEI 7-208151 | 8/1995 | (JP) . |
| HEI 8-158917 | 6/1996 | (JP) . |
| HEI 10-068346 | 3/1998 | (JP) . |
| HEI 10-071325 | 3/1998 | (JP) . |

* cited by examiner

*Primary Examiner*—John J. Vrablik
*Assistant Examiner*—Diem Tran
(74) *Attorney, Agent, or Firm*—Kenyon & Kenyon (57) ABSTRACT

An NOx-absorbing and reducing catalyst device is disposed in an exhaust passage of an engine. The NOx concentration in exhaust gas flowing out of the catalyst device is detected by an NOx sensor. Every time the NOx concentration detected by the NOx sensor increases to a predetermined value, an electronic control unit (ECU) of the engine reactivates the NOx-absorbing and reducing catalyst device by operating the engine at a rich air fuel ratio for a short time. The ECU also detects a deviation of the output of the NOx sensor on the basis of a reference value (corresponding to zero NOx concentration) and an output of the NOx sensor produced when the engine is being operated in a condition where the amount of NOx discharged from the engine is small, for example, a condition where the air-fuel ratio is on the lean side and the load is low (that is, in a condition where the NOx concentration in exhaust gas reaching the NOx sensor becomes substantially zero). Based on the detected deviation, the ECU corrects the output of the NOx sensor.

10 Claims, 7 Drawing Sheets

EMISSION CONTROL APPARATUS FOR INTERNAL COMBUSTION ENGINE

The disclosure of Japanese Patent Application No. HEI 11-86237 filed on Mar. 27, 1999 including the specification, drawings and abstract is incorporated herein by reference in its entirety.

BACKGROUND OF THE INVENTION

1. Field of the Invention

The present invention relates to an emission control apparatus for an internal combustion engine and, more particularly, to an internal combustion engine emission control apparatus having an NOx sensor for detecting an NOx concentration in exhaust gas.

2. Description of the Related Art

An emission control apparatus having an NOx sensor for detecting a concentration of oxides of nitrogen (NOx) in exhaust gas from an internal combustion engine is described in, for example, Japanese Patent Application Laid-Open No. HEI 7-166851. In the emission control apparatus, an NOx-absorbing and reducing catalyst is disposed in an exhaust passage of the engine, and the NOx sensor is disposed in a portion of the exhaust passage downstream of the catalyst so as to detect the NOx concentration in exhaust gas that has passed through the NOx-absorbing and reducing catalyst. The NOx-absorbing and reducing catalyst absorbs NOx from exhaust gas when the air-fuel ratio of exhaust gas flowing into the catalyst is on a lean side of the theoretical air-fuel ratio. The catalyst releases NOx when the oxygen concentration in exhaust gas flowing into the catalyst decreases. Therefore, the NOx-absorbing and reducing catalyst is used as an NOx-lessening catalyst.

The NOx-absorbing capability of NOx-absorbing and reducing catalysts decreases with an increase in the amount of NOx absorbed therein. Therefore, as the amount of NOx absorbed in an NOx-absorbing and reducing catalyst increases, the amount of NOx that passes through the NOx-absorbing and reducing catalyst without being adsorbed therein increases, so that the amount of NOx remaining in the exhaust gas from the exhaust system increases.

Therefore, when the NOx concentration in exhaust gas detected by the NOx sensor disposed in a portion of the exhaust passage downstream of the NOx-absorbing and reducing catalyst increases to a predetermined value, the aforementioned apparatus causes the engine to operate at a fuel-rich air-fuel ratio for a short time so as to change the condition of exhaust gas flowing into the NOx-absorbing and reducing catalyst (in this case, change the exhaust gas air-fuel ratio to a rich side). Due to this operation, NOx is released from the NOx-absorbing and reducing catalyst, so that the NOx-absorbing capability of the NOx-absorbing and reducing catalyst is reactivated.

When the air-fuel ratio of exhaust gas from the engine shifts to the rich side, the oxygen concentration in the exhaust gas decreases and the quantity of components that function as reducers, such as unburned hydrocarbons (HC), carbon monoxide (CO) and the like, increases. When the oxygen concentration in the exhaust gas decreases, NOx is released from the NOx-absorbing and reducing catalyst. That is, the amount of NOx stored in the NOx-absorbing and reducing catalyst decreases. An amount of NOx released from the NOx-absorbing and reducing catalyst reacts with reducer components in exhaust gas on the catalyst, thereby lessening the amount of NOx present in exhaust gas.

However, if the release of NOx from the NOx-absorbing and reducing catalyst and the reduction thereof are controlled on the basis of the exhaust NOx concentration detected by the NOx sensor, a problem may arise if the NOx sensor has deteriorated so that the NOx sensor output drifts. In this case, an NOx concentration indicated by an output of the NOx sensor may deviate from the actual NOx concentration.

If such a sensor output deviation occurs, it becomes difficult to properly perform the release and reduction of NOx (reactivation of the NOx-absorbing and reducing catalyst). Unnecessary performance of the reactivating process may result in degradation of the engine fuel consumption, release of unburned HC and CO into the atmosphere, and an outflow of NOx from the NOx-absorbing and reducing catalyst downstream due to an increased amount of NOx stored in the NOx-absorbing and reducing catalyst, and the like.

Problems substantially the same as those stated above also occur in an apparatus that employs, as an NOx-lessening catalyst, a selective reducing catalyst that is able to selectively reduce NOx present in a lean-air-fuel ratio exhaust gas.

A selective reducing catalyst reduces NOx by using HC and CO components of exhaust gas. If the amounts of HC and CO components present on the selective reducing catalyst become insufficient, the amount of NOx that flows downstream from the catalyst without being reduced increases. For example, in an apparatus in which the amount of NOx that flows out of a selective reducing catalyst without being reduced thereby is detected by an NOx sensor disposed downstream of the catalyst and, in accordance with the amount of unreduced NOx, the engine operating air-fuel ratio is changed to adjust characteristics of exhaust gas (in this case, the amounts of HC and CO components) flowing into the catalyst, a deviation of the output of the NOx sensor causes emission of unreacted HC and CO components into the atmosphere, emission of unreduced NOx into the atmosphere, or other problems.

SUMMARY OF THE INVENTION

Accordingly, it is an object of the invention to provide an internal combustion engine emission control apparatus capable of appropriately lessening the amount of NOx present in exhaust gas on the basis of the Nox sensor output even if the output of the NOx sensor deviates during adjustment of characteristics of exhaust gas flowing into an NOx-lessening catalyst.

To achieve the aforementioned and other objects, the invention provides an emission control apparatus for an internal combustion engine including an NOx-lessening catalyst that is disposed in an exhaust passage of the internal combustion engine and that lessens an amount of NOx present in exhaust gas in accordance with a condition of exhaust gas flowing therein, an NOx sensor disposed in the exhaust passage downstream of the NOx-lessening catalyst, an output of the Nox sensor corresponding to an NOx concentration in exhaust gas flowing out of the NOx-lessening catalyst, and a controller. The controller determines an operational condition of the internal combustion engine, and determines a deviation of the output value of the NOx sensor from a predetermined reference value when the engine is being operated under a predetermined operational condition. Based on the deviation of the output value from the predetermined reference value, the controller corrects the output value of the NOx sensor.

The predetermined operational condition of the internal combustion engine may be a condition where the NOx concentration is normal, and where NOx discharged from the internal combustion engine is small in quantity (e.g., during idling, low-load operation, or fuel cut operation). In such an operational condition of the engine, the NOx concentration in exhaust gas reaching the NOx sensor becomes substantially zero, so that the output value of the NOx sensor should correspond to zero NOx concentration unless the NOx sensor output has drifted. An emission control apparatus according to the invention calculates an extent of drift of the present output value of the NOx sensor based on the reference output value (e.g., an NOx sensor output value corresponding to zero NOx concentration) and the value outputted from the NOx sensor under the aforementioned condition, and corrects the NOx sensor output in accordance with the calculated extent of drift.

Therefore, the emission control apparatus of the invention is able to accurately detect the NOx concentration in exhaust gas even if the NOx sensor output deviates due to deterioration of the sensor or the like.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter with reference to the accompanying drawings.

Figure 1:
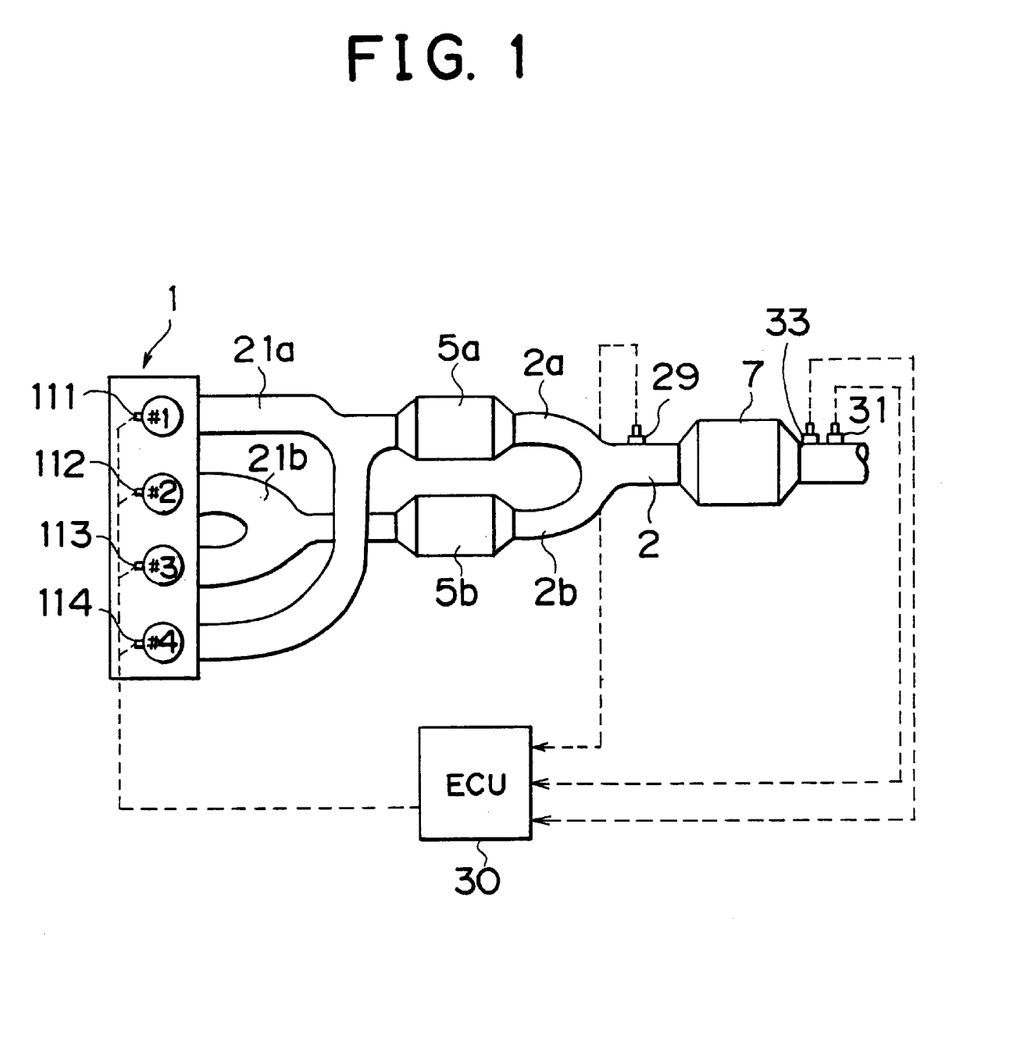
FIG. 1 is a schematic illustration of a construction of a first embodiment in which the emission control apparatus of the invention is applied to a motor-vehicle gasoline engine.

FIG. 1 is a schematic illustration of a construction of a first preferred embodiment in which the emission control apparatus of the invention is applied to an internal combustion engine installed in a motor vehicle.

An internal combustion engine 1 is a four-cylinder gasoline engine having four cylinders (#1– #4). Each cylinder has a fuel injection valve 111–114 for injecting fuel into the cylinder. The engine 1 in this embodiment is a lean-burn engine capable of operating at air-fuel ratios above the theoretical air-fuel ratio (on a fuel-lean side of the theoretical air-fuel ratio).

The cylinders #1– #4 are divided into two groups each consisting of two cylinders whose ignition timings are not consecutive. In this embodiment, the ignition sequence is #1– #3– #4– #2. Therefore, the cylinders #1, #4 form one cylinder group and the cylinders #2, #3 form the other cylinder group. Exhaust ports of the cylinders of each group are connected to an exhaust manifold. The exhaust manifolds of the two cylinder groups are separately connected to exhaust passages. More specifically, the exhaust ports of the group of the cylinders #1, #4 are connected to a group-specific exhaust passage 2a via an exhaust manifold 21a, and the exhaust ports of the group of the cylinders #2, #3 are connected to a group-specific exhaust passage 2b via an exhaust manifold 21b. The group-specific exhaust passages 2a, 2b are individually provided with start catalyst devices 5a, 5b. The group-specific exhaust passages 2a, 2b join into a common exhaust passage 2 downstream of the start catalyst devices 5a, 5b. Each of the start catalyst devices 5a, 5b is formed by a three-way catalyst device that is able to simultaneously lessen the amounts of the HC, CO and NOx components present in exhaust gas when the air-fuel ratio of exhaust gas flowing into the catalyst device is within a narrow range adjacent to the theoretical air-fuel ratio.

The common exhaust passage 2 is provided with an NOx-absorbing and reducing catalyst device 7. An upstream-side air-fuel ratio sensor 29 is disposed in a portion of the common exhaust passage 2 upstream of the NOx-absorbing and reducing catalyst device 7. A downstream-side air-fuel ratio sensor 31 is disposed in a portion of the common exhaust passage 2 downstream of the NOx-absorbing and reducing catalyst device 7. The upstream-side air-fuel ratio sensor 29 and the downstream-side air-fuel ratio sensor 31 are linear air-fuel ratio sensors whose output signals continuously change in accordance with the air-fuel ratio of exhaust gas.

An NOx sensor 33 that outputs a signal in accordance with the NOx concentration in exhaust gas is disposed near the downstream-side air-fuel ratio sensor 31.

An electronic control unit (ECU) 30 is a microcomputer having a CPU, a RAM, a ROM and the like. The ECU 30 executes basic controls of the engine 1, such as air-fuel ratio control, fuel injection control, and the like. The ECU 30 also detects deviation of the NOx sensor output and corrects the sensor output, as described below.

Input ports of the ECU 30 receive signals indicating exhaust air-fuel ratios at the upstream and downstream sides of the NOx-absorbing and reducing catalyst device 7 from the upstream-side air-fuel ratio sensor 29 and the downstream-side air-fuel ratio sensor 31, via separate A/D converters (not shown). Output ports of the ECU 30 are connected to the fuel injection valves 111–114 of the cylinders via a fuel injection circuit (not shown) in order to control the amount of fuel injected into each cylinder and the fuel injection timing.

The NOx-absorbing and reducing catalyst device 7 in this embodiment will be described in detail. The NOx-absorbing and reducing catalyst device 7 has a support formed from, for example, alumina. The support is loaded with a precious metal, such as platinum (Pt) or the like, and at least one component selected from the group consisting of alkali metals (potassium (K), sodium (Na), lithium (Li), cesium (Cs) and the like), alkaline earths (barium (Ba), calcium (Ca) and the like), and rare earths (lanthanum (La), cerium (Ce), yttrium (Y) and the like). The NOx-absorbing and reducing catalyst device 7 absorbs and releases NOx in the following manner. That is, the NOx-absorbing and reducing catalyst device 7 absorbs NOx ($NO_2$, NO) from exhaust gas in the form of nitrate ions $NO_3^-$ when the air-fuel ratio of exhaust gas flowing into the catalyst device 7 is on the lean side. When the air-fuel ratio of exhaust gas flowing into the catalyst device 7 shifts to the rich side, the catalyst device 7 releases NOx.

The mechanism of absorbing and releasing NOx will be described in conjunction with a catalyst device incorporating platinum (Pt) and barium (Ba). Substantially the same mechanism applies to catalyst devices incorporating other precious metals and other alkali metals, alkali earths and rare earths.

When the oxygen concentration in exhaust gas flowing into the catalyst device (inflowing exhaust gas) increases (that is, when the air-fuel ratio of exhaust gas shifts to the lean side), oxygen deposits on platinum in the form of $O_2^-$ or $O^{2-}$. NOx from exhaust gas reacts with $O_2^-$ or $O_2^-$ on platinum to produce $NO_2$. $NO_2$ thus produced is further oxidized on platinum, together with $NO_2$ from inflowing exhaust gas, and absorbed into the catalyst device, and diffuses into the catalyst device in the form of nitrate ions $NO_3^-$ while binding to barium oxide (BaO). Thus, NOx from exhaust gas is absorbed into the catalyst device in the form of a nitrate in lean atmospheres (oxygen-rich atmospheres)

When the oxygen concentration in exhaust gas flowing into the catalyst device considerably decreases (that is, when the air-fuel ratio of exhaust gas shifts to the theoretical air-fuel ratio or to the rich side thereof), the amount of $NO_2$ produced on platinum decreases. Therefore, the above-described reaction reverses, so that nitrate ions $NO_3^-$ are released from the catalyst device in the form of $NO_2$. If reducer components, such as CO or the like, or $CO_2^-$, HC components or the like, are present in exhaust gas, these components reduce $NO_2$ on platinum.

During operation of the engine 1 at lean air-fuel ratios, the NOx-absorbing and reducing catalyst device 7 absorbs NOx from exhaust gas. During operation of the engine 1 at rich air-fuel ratios, the NOx-absorbing and reducing catalyst device 7 releases NOx and causes NOx to be reduced. If the amount of NOx absorbed in the NOx-absorbing and reducing catalyst device 7 increases during operation of the engine 1 at lean air-fuel ratios, the NOx-absorbing capability of the NOx-absorbing and reducing catalyst device 7 decreases, so that unreduced NOx, that is, NOx passing through the NOx-absorbing and reducing catalyst device 7 without being absorbed thereinto, increases in quantity. In such a case, the embodiment performs a rich spike operation in which the engine air-fuel ratio is switched from the lean air-fuel ratio to a rich air-fuel ratio for a short time, in order to release NOx from the NOx-absorbing and reducing catalyst device 7 and reduce NOx (i.e., to reactivate the NOx-absorbing and reducing catalyst device 7).

Next described will be the principle of NOx detection performed by the NOx sensor 33 in this embodiment.

Figure 2:
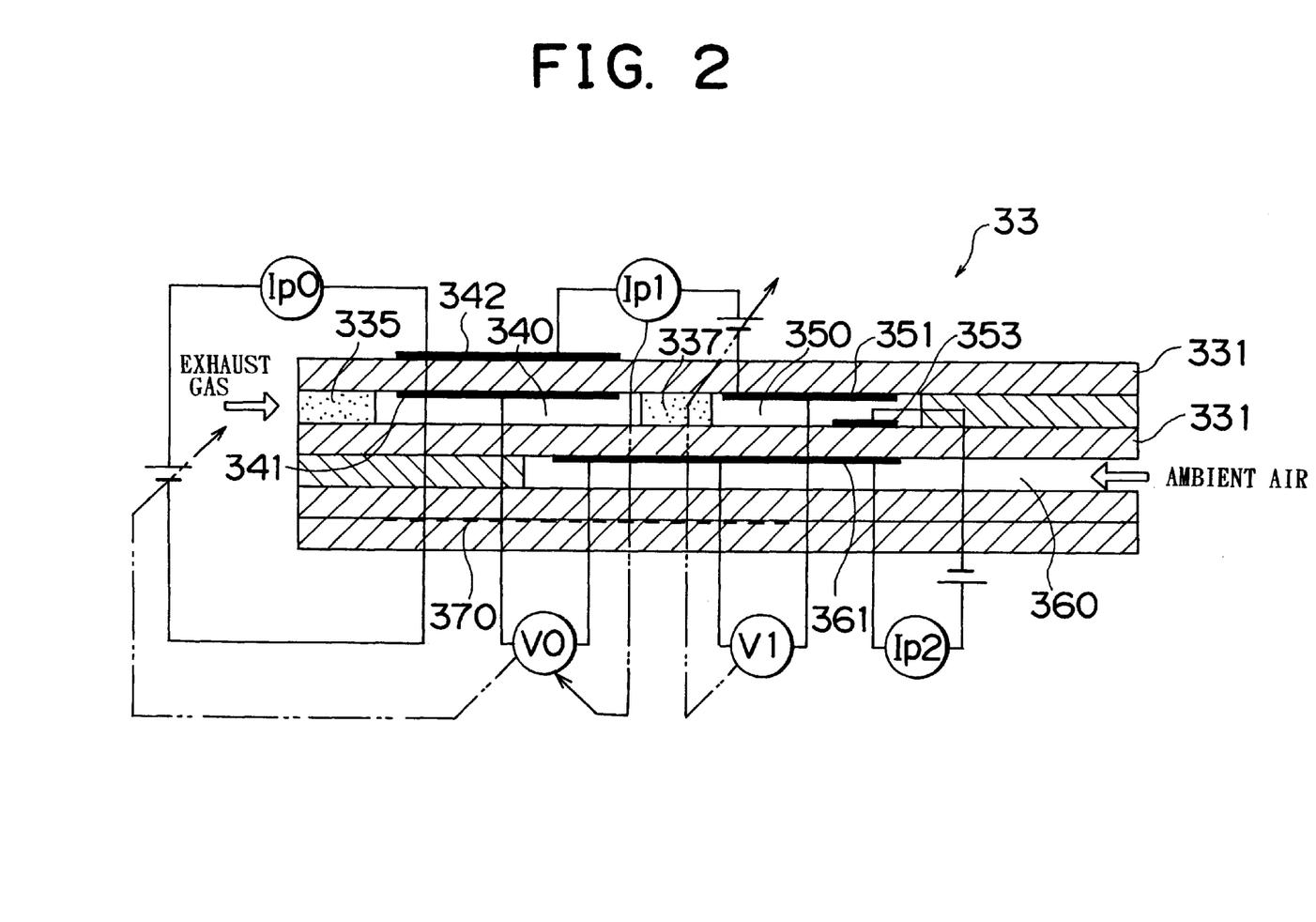
FIG. 2 is a schematic illustration of the construction of an NOx sensor.

FIG. 2 is a schematic illustration of the construction of the NOx sensor 33 in this embodiment.

The NOx sensor 33 is formed by a solid electrolyte 331 of zirconia ($ZrO_2$) or the like. Formed inside the body of solid electrolyte 331 are a first reaction chamber 340 connected to an exhaust passage via a diffusion rate-determining portion 335, a second reaction chamber 350 connected to the first reaction chamber 340 via a diffusion rate-determining portion 337, and an atmospheric chamber 360 into which ambient air is introduced as a standard gas. The diffusion rate-determining portions 335, 337 restrict oxygen components from diffusing into the first reaction chamber 340 or the second reaction chamber 350, and make it possible to maintain oxygen concentration differences between the first reaction chamber 340 and the exhaust passage and between the first reaction chamber 340 and the second reaction chamber 350.

A platinum electrode (cathode) 341 is disposed in the first reaction chamber 340. A similar platinum electrode (anode) 342 is disposed on an outer face of the NOx sensor 33, across a wall of the solid electrolyte 331 from the cathode 341. Another similar platinum electrode 351 and an NOx-detecting rhodium (Rh) electrode 353 are disposed in the second reaction chamber 350. A platinum electrode 361 for reference is disposed in the atmospheric chamber 360. The NOx sensor 33 further has an electric heater 370 for heating the solid electrolyte 331.

The pair of the electrode 341 disposed in the first reaction chamber 340 and the outside electrode 342 and the pair of the electrode 351 disposed in the second reaction chamber 350 and the outside electrode 342 serve as oxygen pumps to discharge oxygen from exhaust gas present in the first reaction chamber 340 and the second reaction chamber 350 to the outside. When a voltage is applied between the electrodes 341, 342 and between the electrodes 351, 342 while the temperature of the solid electrolyte 331 is higher than a predetermined value, oxygen molecules in exhaust gas ionize on the cathodes 341, 351, and the ionized oxygen molecules migrate toward the anode 342 through the wall of the solid electrolyte 331. On the anode 342, oxygen ions bond to form oxygen molecules. In this manner, oxygen is discharged from exhaust gas present in the first reaction chamber 340 and the second reaction chamber 350 to the outside. The aforementioned migration of oxygen ions causes electric currents between the electrode 342 and the electrodes 341, 351, the currents being proportional to the amount of oxygen molecules migrating per unit time.

By controlling the currents through the solid electrolyte 331 between the electrodes, the amount of oxygen discharged from each reaction chamber can be controlled.

In this embodiment, the electrode 361 disposed in the atmospheric chamber 360 and the electrodes 341, 351 disposed in the first and second reaction chambers 340, 350 form oxygen cells therebetween. Exhaust gas in each of the first and second reaction chambers has a lower oxygen concentration than ambient air, that is, an oxygen concentration difference exists between air in the atmospheric chamber 360 and exhaust gas in each reaction chamber. Therefore, when the temperature of the solid electrolyte 331 separating the atmospheric chamber 360 from each reaction chamber 340, 350 rises to or above a predetermined temperature, oxygen migrates from the atmospheric chamber 360 to the reaction chambers 340, 350 through a wall of the solid electrolyte 331 therebetween in accordance with the oxygen concentration differences therebetween provided that no external voltage is applied between the electrode 361 and the electrodes 341, 351. More specifically, oxygen molecules present in air in the atmospheric chamber 360 ionize on the electrode 361, and oxygen ions migrate through the wall portion of the solid electrolyte 331 to the reaction chambers 340, 350, in which the oxygen concentration is relatively low. Oxygen ions form oxygen molecules on the electrodes 341, 351 of the reaction chambers 340, 350. Therefore, voltage is produced between the electrode 361 and the electrode 341, 351 of each reaction chamber in accordance with the difference between the oxygen concentration in air (atmosphere) in the atmospheric chamber 360 and the oxygen concentration exhaust gas in each reaction chamber. Since the oxygen concentration in the atmosphere is substantially constant, the electric potential difference V0, V1 (see FIG. 2) between the electrode 361 of the atmospheric chamber 360 and the electrode 341, 351 of each reaction chamber indicates the oxygen concentration in exhaust gas present in each reaction chamber 340, 350.

The electrodes 341, 342 and the electrodes 351, 342 function as oxygen pumps to discharge oxygen from the reaction chambers to the outside. The oxygen discharging rate of each oxygen pump is controlled so that the oxygen concentration in exhaust gas present in each reaction chamber (that is, the voltage V0, V1) remains at a fixed value, by adjusting a pump current Ip0, Ip1 (see FIG. 2) between the electrodes. In this embodiment, the pump currents Ip0, Ip1 are controlled so that the oxygen concentrations in the first reaction chamber 340 and the second reaction chamber 350 become equal to, for example, about 1 ppm and about 0.01 ppm, respectively. Thus, a reducing atmosphere with a low oxygen concentration is maintained in the second reaction chamber 350. NOx (NO, NO$_2$) is not discharged from exhaust gas in the reaction chambers to the outside by the oxygen pumps, so that the NOx concentration in exhaust gas present in the first and second reaction chambers remain substantially equal to that in exhaust gas present outside the reaction chambers. However, the NOx-detecting electrode 353 of the second reaction chamber 350, formed from rhodium (Rh), functions as a reducing catalyst, that is, reduces NOx (NO, NO$_2$) in a reducing atmosphere. Since a voltage is applied between the NOx-detecting electrode 353 and the reference electrode 361 of the atmospheric chamber 360, reactions occur on the NOx-detecting electrode 353 as follows:

or

As a result of the reduction of NOx, oxygen is produced. Oxygen ionizes on the NOx-detecting electrode 353. Oxygen ions migrate through the wall portion of the solid electrolyte 331 to the reference electrode 361, and form oxygen molecules on the reference electrode 361. Since the oxygen concentration in the second reaction chamber 350 is very low, it can be considered that substantially the entire amount of oxygen ions flowing in the solid electrolyte toward the reference electrode 361 is produced by the reduction of NOx. Therefore, the amount of oxygen ions flowing in the solid electrolyte per unit time corresponds to the NOx concentration in the second reaction chamber (the NOx concentration in exhaust gas in the exhaust passage). Therefore, the NOx concentration in exhaust gas in the exhaust passage can be detected by measuring the current (Ip2 in FIG. 2) produced by the aforementioned migration of oxygen ions. The NOx sensor 33 in this embodiment converts the value of current Ip2 into a voltage signal, and outputs the voltage signal VNOX in accordance with the NOx concentration in exhaust gas flowing out of the NOx-absorbing and reducing catalyst device 7.

In this embodiment, every time the output of the NOx sensor 33 reaches a predetermined value VOXL during lean air-fuel ratio operation of the engine 1, the engine 1 is caused to operate at a rich air-fuel ratio for a short time (rich spike operation), thereby switching the air-fuel ratio of exhaust gas flowing into the NOx-absorbing and reducing catalyst device 7 to a rich air-fuel ratio. As a result, the oxygen concentration in exhaust gas decreases, and the reducer components contained in exhaust gas, such as unburned HC, CO and the like, increase in amount. Therefore, NOx stored in the NOx-absorbing and reducing catalyst device 7 is released, and reduced on the NOx-absorbing and reducing catalyst device 7 by the reducer components present in exhaust gas. The operation of causing the release of NOx from the NOx-absorbing and reducing catalyst device and the reduction of NOx is termed herein "NOx-absorbing and reducing catalyst reactivating operation".

Figure 3:
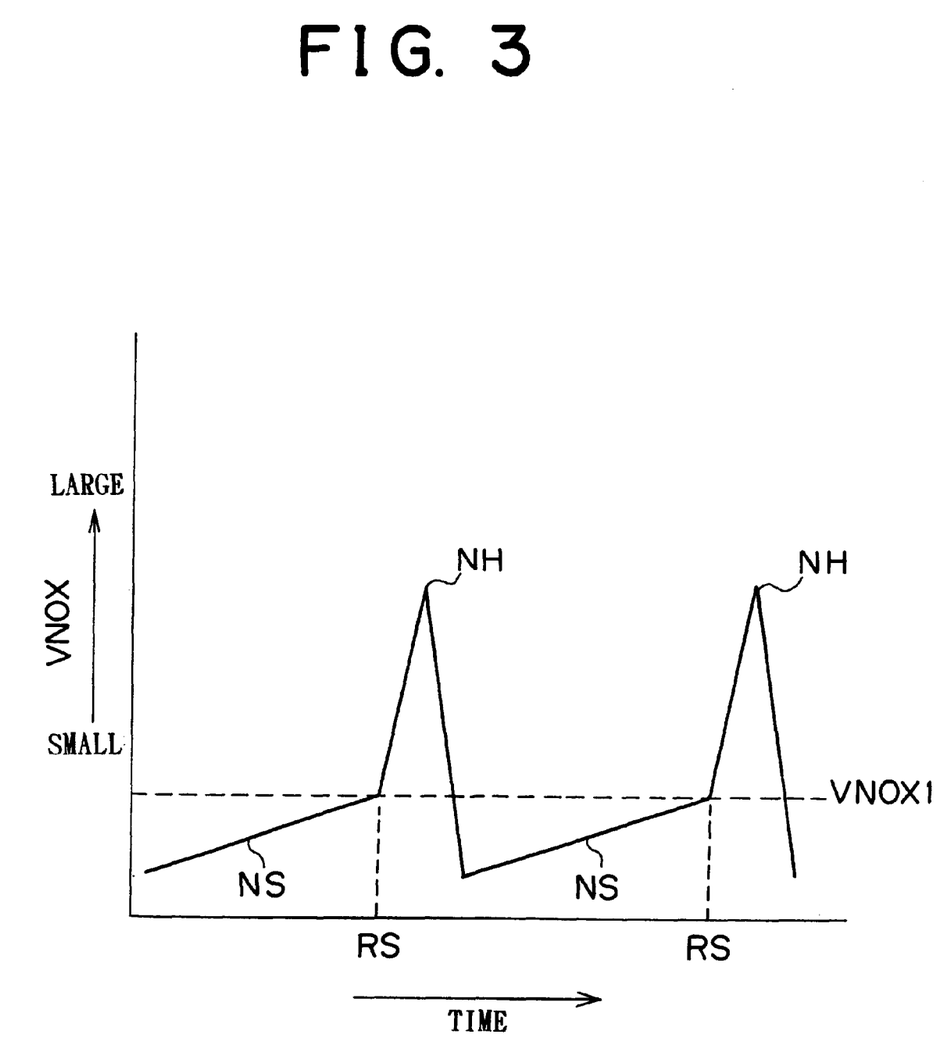
FIG. 3 is a diagram indicating changes in the NOx concentration in exhaust gas flowing out of an NOx-absorbing and reducing catalyst device around the time of a catalyst reactivating operation.

FIG. 3 indicates changes in the NOx concentration in exhaust gas flowing out of the NOx-absorbing and reducing catalyst device 7, the changes being caused by executing the reactivating operation.

In FIG. 3, the vertical axis indicates the output VNOX of the NOx sensor 33 disposed downstream of the NOx-absorbing and reducing catalyst device 7, and the horizontal axis indicates time. During lean air-fuel ratio operation of the engine 1, the NOx-absorbing and reducing catalyst device 7 absorbs NOx from exhaust gas. As the amount of NOx absorbed in the NOx-absorbing and reducing catalyst device 7 increases, the NOx absorbing capability of the catalyst device 7 decreases, so that the amount of unburned NOx that flows out of the NOx-absorbing and reducing catalyst device 7 increases gradually. Therefore, the output VNOX of the NOx sensor 33 also gradually increases (indicated by NS in FIG. 3). The control circuit 30 in this embodiment performs the rich spike operation of operating the engine 1 at a rich air-fuel ratio for a short time, to reactivate the NOx-absorbing and reducing catalyst device 7 (at time point RS in FIG. 3) when the outflow NOx concentration reaches a predetermined value VNOX1. Due to the rich spike, rich air-fuel ratio exhaust gas flows into the NOx-absorbing and reducing catalyst device 7, so that unreduced NOx is released from the NOx-absorbing and reducing catalyst device 7 (indicated by NH in FIG. 3). Released NOx is reduced on the NOx-absorbing and reducing catalyst device 7, so that the release of unreduced NOx ends in a short time.

If the NOx sensor 33 constructed as illustrated in FIG. 2 is used to detect the NOx concentration in exhaust gas downstream of the NOx-absorbing and reducing catalyst device 7, the sensor output comes to drift, that is, the value detected by the NOx sensor 33 deviates from the actual NOx concentration. Such drift of the output of the NOx sensor 33 makes it impossible to perform the operation of reactivating the NOx-absorbing and reducing catalyst device 7 at an appropriate timing as indicated in FIG. 3.

Therefore, this embodiment detects deviation of the output of the NOx sensor 33, and corrects the output of the NOx sensor 33, in a manner described below.

The detection of deviation of the output of the NOx sensor 33 and the correction of deviation of the sensor output will be described below.

(1) Detection of Deviation of NOx Sensor Output

In this embodiment, deviation of the output of the NOx sensor 33 is detected on the basis of the output of the NOx sensor 33 occurring when the engine 1 is operated in a condition in which the NOx concentration of exhaust gas flowing out of the NOx-absorbing and reducing catalyst device 7 becomes substantially zero. In this condition, the output of the NOx sensor 33 is essentially expected to equal a value corresponding to "zero NOx concentration". Therefore, the difference between the output of "zero NOx concentration" of the NOx sensor 33 and the actual output of the NOx sensor 33 corresponds to the deviation of the output of the NOx sensor 33.

The aforementioned "condition in which the NOx concentration of exhaust gas flowing out of the NOx-absorbing and reducing catalyst device 7 becomes substantially zero" means:

(i) a condition where the NOx-absorbing and reducing catalyst device 7 is normally functioning; and (ii) a condition where the engine 1 is being operated so that the amount of NOx discharged decreases.

The "condition where the NOx-absorbing and reducing catalyst device 7 is normally functioning" means:

(i-1) a condition where the NOx-absorbing and reducing catalyst device has not deteriorated; and (i-2) a condition where NOx can be absorbed from exhaust gas (e.g., the air-fuel ratio of exhaust gas flowing into the NOx-absorbing and reducing catalyst device 7 is on the lean side, and the temperature of the NOx-absorbing and reducing catalyst device 7 is within an appropriate range).

The condition (i-1) will first be described.

The NOx-absorbing and reducing catalyst device 7 deteriorates and the NOx absorbing capability thereof decreases, for various factors. For example, if exhaust gas contains SOx (oxides of sulfur), the NOx-absorbing and reducing catalyst device 7 absorbs SOx based on substantially the same mechanism as that for NOx absorption, and retains SOx therein in the form of sulfates (e.g., $BaSO_4$). However, sulfates have higher stability than nitrates, so that sulfates cannot be released from the NOx-absorbing and reducing catalyst device 7 by an ordinary operation for reactivating the NOx-absorbing and reducing catalyst device 7. Therefore, if SOx is present in exhaust gas, SOx gradually accumulates in the NOx-absorbing and reducing catalyst device 7 during operation. As a result, the amount of absorbents (e.g., BaO) that can participate in NOx absorption decreases, so that the NOx-absorbing capability of the NOx-absorbing and reducing catalyst device 7 decreases. As the NOx-absorbing and reducing catalyst device 7 deteriorates in this manner, the amount of NOx passing through the NOx-absorbing and reducing catalyst device 7 without being absorbed thereinto increases, so that it becomes impossible to establish the condition in which the amount of NOx in exhaust gas flowing out of the NOx-absorbing and reducing catalyst device 7 becomes substantially zero.

This embodiment determines whether the NOx-absorbing and reducing catalyst device 7 has deteriorated, by employing one of the methods described below.

Figure 4:
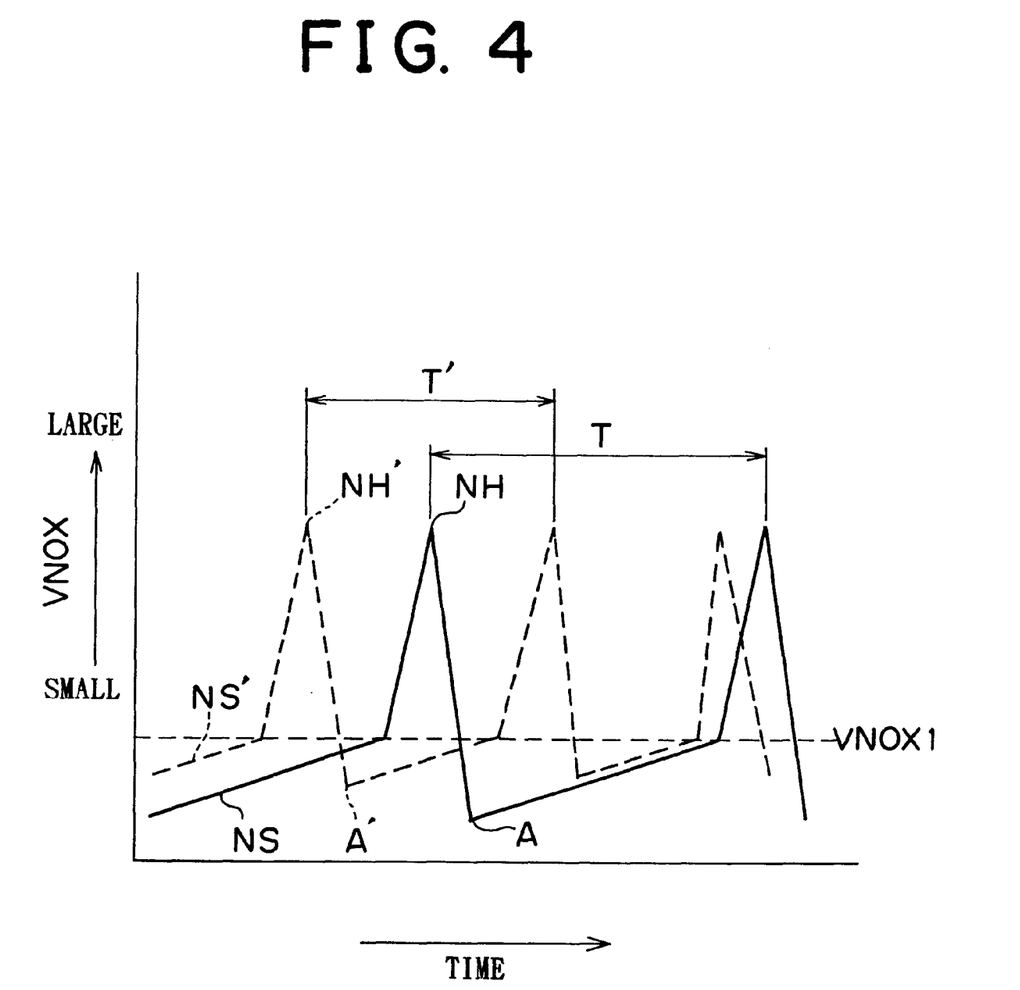
FIG. 4 is a diagram indicating changes in the NOx concentration in exhaust gas flowing out of the NOx-absorbing and reducing catalyst device in a case where the catalyst device has deteriorated.

FIG. 4 is a diagram indicating changes in the NOx concentration in exhaust gas flowing out of the NOx-absorbing and reducing catalyst device 7, the changes occurring before and after the reactivating operation (rich spike). In FIG. 4, a solid line indicates the NOx concentration in exhaust gas flowing out of the NOx-absorbing and reducing catalyst device 7 in a case where the Nox-absorbing and reducing catalyst device 7 has not deteriorated. A broken line in FIG. 4 indicates the NOx concentration in exhaust gas flowing out of the NOx-absorbing and reducing catalyst device 7 in a case where the Nox-absorbing and reducing catalyst device 7 has deteriorated.

The NOx-absorbing capability of the NOx-absorbing and reducing catalyst device 7 decreases with increases in the amount of NOx stored in the NOx-absorbing and reducing catalyst device 7. Therefore, while NOx is being absorbed into the NOx-absorbing and reducing catalyst device 7, the NOx concentration in exhaust gas flowing out of the NOx-absorbing and reducing catalyst device 7 gradually increases as the amount of NOx stored in the NOx-absorbing and reducing catalyst device 7 increases (indicated by NS in FIG. 4). When the NOx concentration reaches the predetermined value (VNOX1), the above-described reactivating operation is performed, so that the downstream-side NOx concentration temporarily rises (indicated by NH in FIG. 4), and then falls. immediately after the reactivating operation ends, the downstream-side NOx concentration reaches a minimum value (indicated by A in FIG. 4) that corresponds to the maximum absorbing capability of the NOx-absorbing and reducing catalyst device 7.

However, when the NOx-absorbing capability of the NOx-absorbing and reducing catalyst device 7 has considerably decreased due to deterioration of the catalyst device 7, the NOx-absorbing capability of the NOx-absorbing and reducing catalyst device 7 cannot be sufficiently regained despite execution of the reactivating operation as indicated by the broken line in FIG. 4, so that the minimum NOx concentration (indicated by A' in FIG. 4) becomes higher than the minimum NOx concentration (point A) occurring when the NOx-absorbing and reducing catalyst device 7 has not deteriorated. Therefore, by monitoring the NOx concentration in outflow exhaust gas from the NOx-absorbing and reducing catalyst device 7 occurring immediately after the end of the reactivating operation during a constant engine operating condition, the apparatus of the embodiment is able to determine that the NOx-absorbing and reducing catalyst device 7 has deteriorated, when the minimum NOx concentration (point A' in FIG. 4) increases to or above a predetermined level.

Furthermore, as the NOx-absorbing and reducing catalyst device 7 deteriorates, the duration of execution of a reactivating operation T' (i.e., the amount of time between the end of a reactivating operation and the reach of the NOx concentration to the predetermined value VNOX1) becomes shorter than the duration (indicated by T in FIG. 4) of a reactivating operation executed when the NOx-absorbing and reducing catalyst device 7 has not deteriorated. Therefore, it is also possible to monitor the duration of execution of the operation of reactivating the NOx-absorbing and reducing catalyst device 7 during a constant engine operating condition and to determine that the NOx-absorbing and reducing catalyst device 7 has deteriorated, when the duration becomes shorter than a predetermined value.

Although, during the reactivating operation, the air-fuel ratio of exhaust gas flowing into the NOx-absorbing and reducing catalyst device 7 is shifted to a rich air-fuel ratio, the air-fuel ratio of exhaust gas flowing out of the NOx-absorbing and reducing catalyst device 7 does not immediately change to the rich air-fuel ratio side. If the air-fuel ratio of exhaust gas flowing into the NOx-absorbing and reducing catalyst device 7 becomes a rich air-fuel ratio, NOx is released from the NOx-absorbing and reducing catalyst device 7, and then reduced through the reactions with reducer components present in exhaust gas, such as HC, CO and the like. That is, the HC and CO components in exhaust gas are oxidized by NOx released from the NOx-absorbing and reducing catalyst device 7. While the NOx-absorbing and reducing catalyst device 7 is releasing NOx, the air-fuel ratio of exhaust gas flowing downstream of the NOx-absorbing and reducing catalyst device 7 is kept at or close to the theoretical air-fuel ratio. When the release of NOx from the NOx-absorbing and reducing catalyst device 7 ends, the oxidation of the HC and CO components discontinues, so that the air-fuel ratio of exhaust gas on the downstream side of the NOx-absorbing and reducing catalyst device 7 changes to the rich air-fuel ratio side as is the case with the air-fuel ratio of exhaust gas on the upstream side of the NOx-absorbing and reducing catalyst device 7. The duration of maintenance of exhaust air-fuel ratios equal or close to the theoretical air-fuel ratio on the downstream side of the NOx-absorbing and reducing catalyst device 7 after the start of the reactivating operation increases in accordance with the amount of NOx stored in the NOx-absorbing and reducing catalyst device 7. Therefore, if the NOx-absorbing and reducing catalyst device 7 deteriorates so that the amount of NOx that can be stored in the NOx-absorbing and reducing catalyst device 7 decreases, the theoretical air-fuel ratio maintaining duration after the start of the reactivating operation becomes shorter. Therefore, it is also possible to monitor the exhaust air-fuel ratio at the downstream side of the NOx-absorbing and reducing catalyst device 7 through the use of the downstream-side air-fuel ratio sensor 31 after the start of the reactivating operation while the engine is being operated under a constant condition and to determine that the NOx-absorbing and reducing catalyst device 7 has deteriorated, when the theoretical air-fuel ratio maintaining duration becomes shorter than a predetermined value.

The condition (i-2) will next be described.

In order to enable the NOx-absorbing and reducing catalyst device 7 to absorb NOx from inflow of exhaust gas, it is necessary that the air-fuel ratio of exhaust gas flowing into the NOx-absorbing and reducing catalyst device 7 be on the lean side and the temperature of the NOx-absorbing and reducing catalyst device 7 be within an appropriate range.

If the temperature of the NOx-absorbing and reducing catalyst device 7 is lower than its activation temperature, the NOx-absorbing and reducing catalyst device 7 is not able to absorb NOx. If the temperature of the NOx-absorbing and reducing catalyst device 7 is excessively high, the NOx-absorbing and reducing catalyst device 7 releases NOx due to heat. Therefore, in order to achieve an approximately zero NOx concentration in exhaust gas flowing out of the NOx-absorbing and reducing catalyst device 7, it is necessary that the temperature of the NOx-absorbing and reducing catalyst device 7 be equal to or higher than the activation temperature (e.g., about 250° C.) and that the temperature of the NOx-absorbing and reducing catalyst device 7 be within an appropriate range (e.g., about 250° C. to about 400° C.).

Therefore, in order to enable the NOx-absorbing and reducing catalyst device 7 to absorb NOx, it is necessary that the inflow exhaust gas air-fuel ratio be on the lean side and that the temperature of the NOx-absorbing and reducing catalyst device 7 be within an appropriate range (e.g., about 250–400° C.).

In this embodiment, a relationship between the catalyst temperature and the engine exhaust gas temperature is experimentally determined beforehand and stored in the ROM of the ECU 30 in the form of a numerical table. Based on this relationship, the ECU 30 calculates a catalyst temperature from the exhaust gas temperature during operation of the engine. The engine exhaust gas temperature may be directly detected by a temperature sensor disposed in the exhaust passage or may also be calculated from an engine load condition (air-fuel ratio, fuel injection amount, revolution speed) on the basis of an engine load condition-engine exhaust gas temperature relationship that is experimentally predetermined.

The condition (ii) will be described.

The amount of NOx discharged from the engine 1 changes depending on engine load conditions such as operational air-fuel ratio, fuel injection amount, revolution speed, and the like. Normally, the amount of NOx discharged from an engine increases during high-load and high-speed operation, and decreases during low-load operation such as idling or the like.

When engine combustion is stopped for a predetermined period, that is, when fuel supply to the engine is stopped for a predetermined period by a fuel-cut operation or the like (for example, when an engine brake state is continued for a predetermined period during travel on a long downhill), the amount of NOx discharged from the engine becomes substantially zero.

Therefore, this embodiment determines that the engine 1 is being operated in a low-NOx condition, when the engine 1 is being operated with a low load (for example, when the engine 1 is idling) or when fuel cut has continued for a predetermined period.

As a summary of the above description of the conditions (i) and (ii), this embodiment detects deviation of output of the NOx sensor 33 when the following conditions are met.

(A) The catalyst device has not deteriorated.

(B) The catalyst device temperature is within a predetermined range.

(C) A lean-air-fuel ratio and low-load operation is being performed or a fuel cut operation has continued for a predetermined length of time.

When the conditions (A), (B) and (C) are met, the amount of NOx discharged from the engine 1 becomes very small and the small amount of NOx discharged the engine 1 is substantially completely absorbed into the NOx-absorbing and reducing catalyst device 7, so that the NOx concentration in exhaust gas that passes through the NOx-absorbing and reducing catalyst device 7 and reaches the NOx sensor 33 disposed downstream of the NOx-absorbing and reducing catalyst device 7 becomes substantially zero.

This embodiment detects drift of the output of the NOx sensor 33 based on the deviation of the actual output of the NOx sensor 33 occurring when the aforementioned conditions are met from the NOx sensor output corresponding to the zero NOx concentration.

Figure 5:
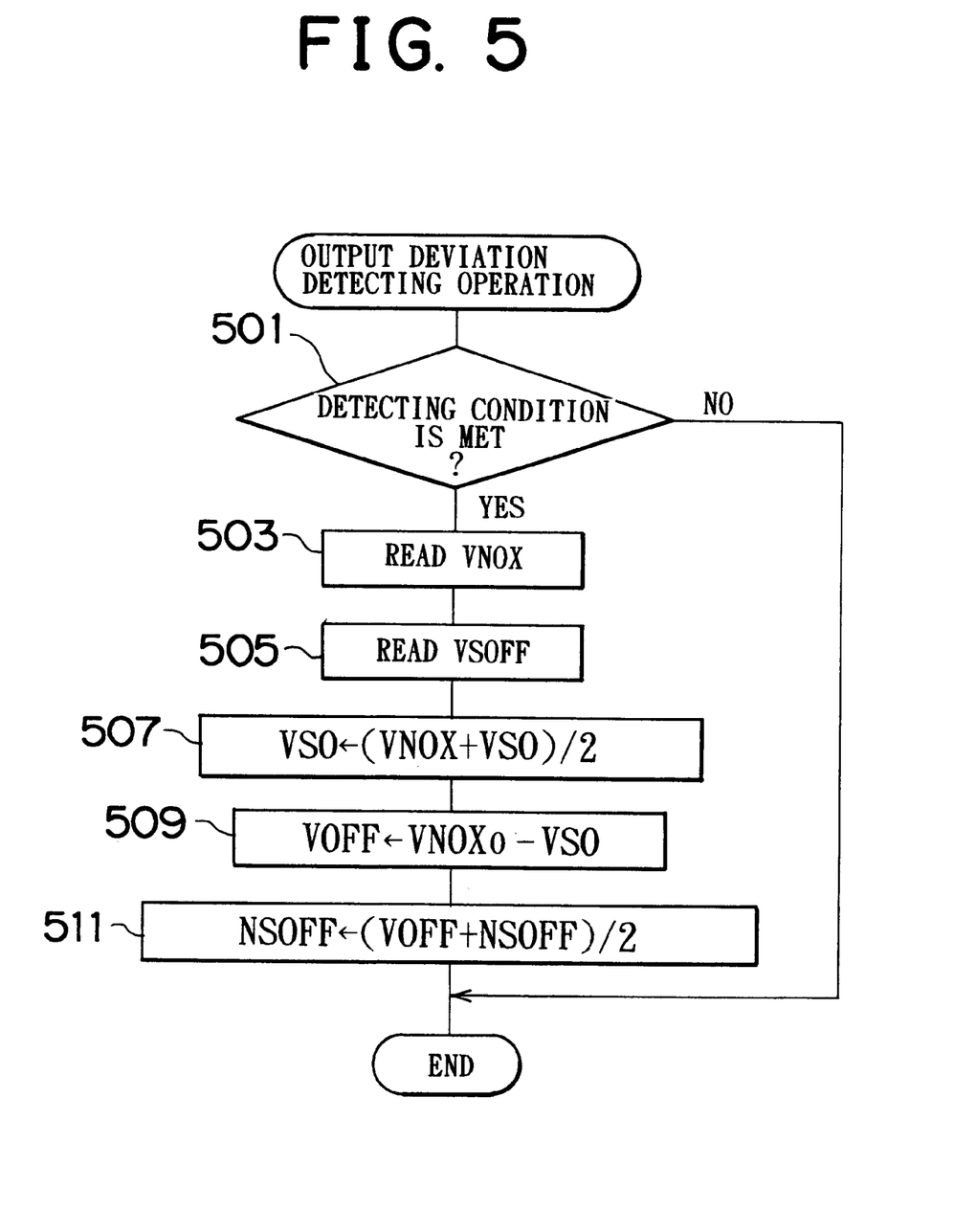
FIG. 5 is a flowchart illustrating an operation of detecting deviation of the output of the NOx sensor.

FIG. 5 is a flowchart illustrating an operation of detecting deviation of the output of the NOx sensor 33 as described above. This operation is performed as a routine that is executed periodically by the ECU 30.

Referring to FIG. 5, when the operation is started, the ECU 30 determines in step 501 whether the condition for detecting deviation of the output of the NOx sensor 33 is met. It is determined in step S501 that the detecting condition is met, when all the three conditions (A), (B) and (C) are met, as described above.

When the detecting condition is not met, there is a possibility that NOx is contained in exhaust gas that has passed through the NOx-absorbing and reducing catalyst device 7. Therefore, the ECU 30 immediately ends the operation without detecting output deviation of the NOx sensor 33. When the detecting condition is met, exhaust gas presently flowing to the NOx sensor 33 contains substantially no NOx, so that the ECU 30 executes the processes of step 503 and steps that follow.

In step 503, the ECU 30 reads the output VNOX of the NOx sensor 33. Subsequently in step 505, the ECU 30 reads the sensor output deviation NSOFF calculated during the previous execution of the operation. In step 507, the ECU 30 calculates a smoothed output VSO of the NOx sensor 33 as in VSO=(VNOX+VSO)/2. That is, the smoothed output VSO is calculated as an arithmetic mean of the smoothed output VSO calculated during the previous execution of the operation and the output VNOX of the NOx sensor 33 read during the present execution of the operation. The smoothing process of step 507 smoothes fluctuation of the output of the NOx sensor 33 caused by external disturbance and other influences.

Subsequently in step 509, the ECU 30 calculates a sensor output deviation (offset) VOFF. The offset VOFF is calculated as in VOFF=VNOX$_0$−VSO, where VNOX$_0$ is a reference value of output of the NOx sensor 33 corresponding to the zero NOx concentration.

In step 511, the ECU 30 smoothes the offset VOFF, that is, calculates a smoothed value NSOFF of the offset as in NSOFF=(VOFF+NSOFF)/2. The smoothed offset value NSOFF is stored into, for example, a backup RAM capable of retaining stored contents even after the power is switched off.

This embodiment detects deviation of the output of the NOx sensor 33 during operation of the engine 1. This is because after the engine 1 stops, the engine 1 discharges no NOx and, therefore, the NOx concentration in exhaust gas near the NOx sensor 33 becomes very low. It is also possible to detect deviation of the output of the NOx sensor 33 before the engine 1 is started (or after the engine 1 is stopped), if the NOx sensor 33 is sufficiently heated beforehand by the heater 370 (see FIG. 2).

Next described with reference to FIG. 6 will be a reactivating operation based on the NOx sensor output that is corrected by using the offset value NSOFF of the output of the NOx sensor 33 calculated by the above-described process. The routine illustrated in FIG. 7 is also periodically executed by the ECU 30.

In this routine, the ECU 30 reactivates the NOx-absorbing and reducing catalyst device 7 by performing a rich spike operation in which the engine 1 is operated at a rich air-fuel ratio for a short time, every time the corrected output of the NOx sensor 33 reaches a predetermined value VNOX1 during a lean air-fuel ratio operation of the engine 1 (while the NOx-absorbing and reducing catalyst device 7 is absorbing NOx).

In step 601, the ECU 30 determines whether the engine 1 is being operated at a lean air-fuel ratio. If the engine 1 is not being operated at a lean air-fuel ratio (that is, when the engine 1 is being operated at a rich air-fuel ratio or the theoretical air-fuel ratio), there is no need to perform the operation of reactivating the NOx-absorbing and reducing catalyst device 7, so that the ECU 30 immediately ends the routine.

When the engine 1 is being operated at a lean air-fuel ratio, the ECU 30 reads in step 603 the output VNOX of the NOx sensor 33. Subsequently in step 605, the ECU 30 calculates a smoothed value VS of the sensor output as in VS=(NOX+VS)/2, through the processing substantially the same as in step 507 in FIG. 5.

Subsequently in step 607, the ECU 30 reads the smoothed offset value NSOFF of the output of the NOx sensor 33 calculated in the routine illustrated in FIG. 5. In step 609, the ECU 30 corrects the smoothed sensor output value VS by using the value NSOFF, that is, calculates a corrected output value NOS as in NOS=VS+NSOFF.

Subsequently in step 611, the ECU 30 determines whether the operation of reactivating the NOx-absorbing and reducing catalyst device 7 based on the corrected output value NOS is needed, that is, whether the corrected value NOS is equal to or greater than the predetermined value VNOX1. If NOS≧VNOX1 (meaning that the reactivating operation is needed), the ECU 30 proceeds to step 613, in which the ECU 30 sets the value of a reactivating operation execution flag XRS to "1". The ECU 30 then ends the routine.

If the value of the reactivating operation execution flag XRS is set to "1", the operational air-fuel ratio of the engine 1 is switched to a rich air-fuel ratio for a predetermined length of time and then returned to a lean air-fuel ratio by another routine (not shown) of the ECU 30. When the air-fuel ratio is returned to a lean air-fuel ratio, the value of the reactivating operation execution flag XRS is reset to zero. Through this rich spike operation, NOx stored in the NOx-absorbing and reducing catalyst device 7 is released from the catalyst device 7, and then reduced by the HC and CO components of exhaust gas of a rich air-fuel ratio.

As is apparent from the above description, this embodiment detects output deviation of the NOx sensor 33 and, based on the detected sensor output deviation, corrects the actual output of the NOx sensor 33. This operation makes it possible to constantly detect accurate NOx concentration in exhaust gas flowing out of the NOx-absorbing and reducing catalyst device 7, so that the reactivation of the NOx-absorbing and reducing catalyst device 7 can be performed at appropriate timing.

Although this embodiment reactivates the NOx-absorbing and reducing catalyst device 7 by operating the engine 1 at a rich air-fuel ratio for a short time, the NOx-absorbing and reducing catalyst device 7 can also be reactivated through a different operation.

FIG. 7 is a schematic illustration of a construction of a second embodiment of the invention.

The second embodiment reactivates an NOx-absorbing and reducing catalyst device 7 by injecting a reducing agent into a portion of an exhaust passage upstream of the NOx-absorbing and reducing catalyst device 7. In FIG. 7, portions and elements comparable to those shown in FIG. 1 are represented by comparable reference characters. The apparatus shown in FIG. 7 differs from the apparatus of the first embodiment in that a reducer supplying device 9 is provided. The reducer supplying device 9 has a reducer injecting nozzle 91 that injects a reducer into a portion of an exhaust passage 2 upstream of the NOx-absorbing and reducing catalyst device 7, a pressurized reducer source 92, and a control valve 93 that controls the amount of the reducer injected from the reducer injecting nozzle 91.

The reducer injected from the reducer injecting nozzle 91 may be a reducing component such as hydrogen, carbon monoxide or the like, or a liquid or gaseous hydrocarbon, or the like. This embodiment uses fuel of an engine 1 as a reducer, considering the convenience in storage and replenishment. Therefore, the pressurized reducer source 92 is supplied with pressurized fuel from a fuel system (not shown) of the engine 1. The pressurized reducer source 92 supplies pressurized fuel to the reducer injecting nozzle 91 via the control valve 93.

Figure 6:
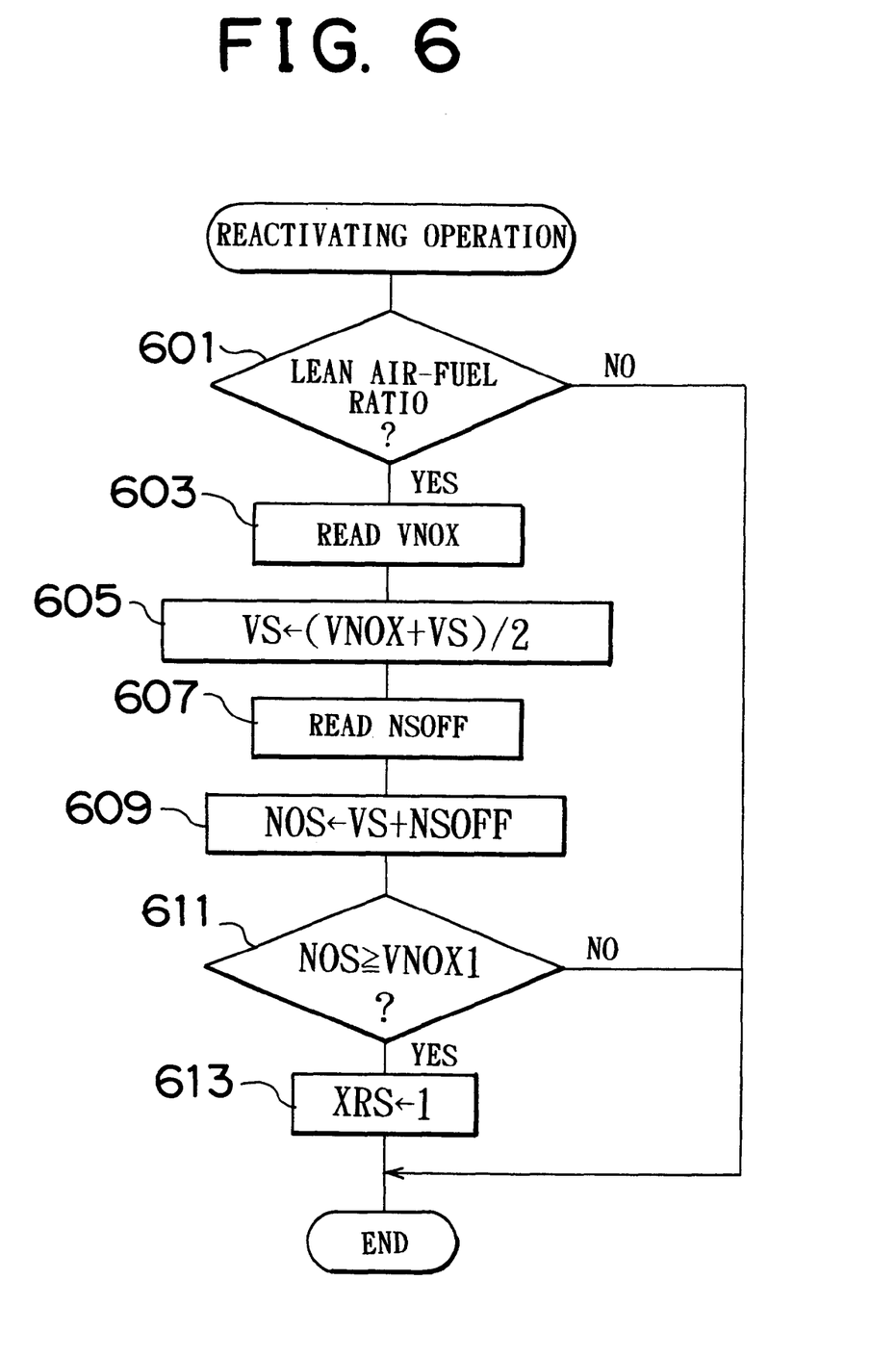
FIG. 6 is a flowchart illustrating an operation of reactivating the NOx-absorbing and reducing catalyst device on the basis of a corrected output of the NOx sensor.
Figure 7:
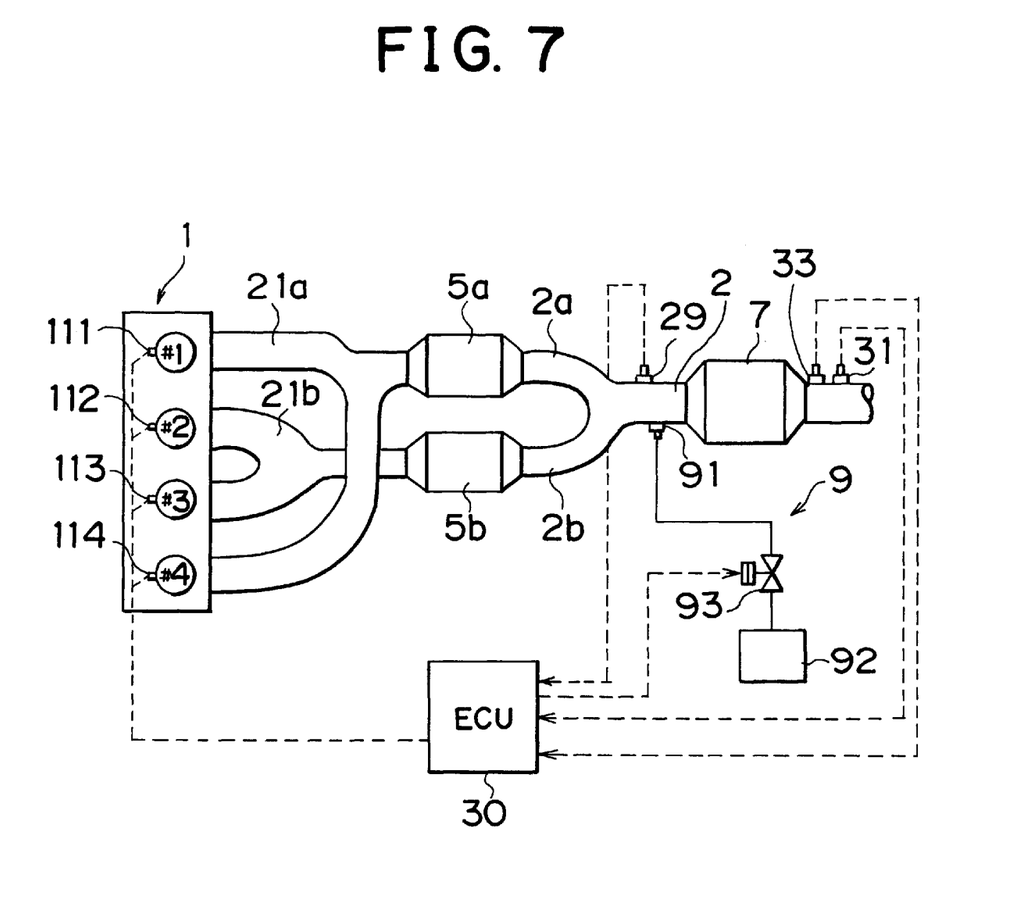
FIG. 7 is a schematic illustration of a construction of a second embodiment in which the emission control apparatus of the invention is applied to a motor-vehicle gasoline engine.

The operation of detecting output deviation of the NOx sensor and the operation of reactivating the NOx-absorbing and reducing catalyst device 7 in this embodiment are substantially the same as the operations illustrated in FIGS. 5 and 6. In this embodiment, when the value of the reactivating operation execution flag is set to "1" by the operation as illustrated in FIG. 6, the ECU 30 causes the reducer supplying device 9 to inject the reducer into the exhaust passage 2 for a short time. When an amount of the reducer injected reaches the NOx-absorbing and reducing catalyst device 7, a portion of the amount of the reducer is oxidized on the NOx-absorbing and reducing catalyst device 7 so that the air-fuel ratio of the atmosphere around the NOx-absorbing and reducing catalyst device 7 becomes a rich air-fuel ratio, and unburned HC, CO and the like are produced. Therefore, NOx stored in the NOx-absorbing and reducing catalyst device 7 is released, and then reduced by HC, CO and the like in exhaust gas.

Although the first and second embodiments employ the NOx-absorbing and reducing catalyst device 7 as an NOx-lessening catalyst device, the NOx-lessening catalyst device employed in the invention is not limited to an NOx-absorbing and reducing catalyst device. The foregoing embodiments may also employ as an Nox-lessening catalyst device, for example, a selective reducing catalyst device.

The selective reducing catalyst device suitable to the invention includes, for example, a catalyst device having zeolite as a catalyst component and loaded with copper (Cu) through ion exchange or the like, a catalyst device loaded with platinum (Pt) through impregnation or the like. Such a selective reducing catalyst device has the function of reducing NOx in exhaust gas into $N_2$ by causing NOx to react selectively with HC and CO in the presence of appropriate amounts of HC, CO and the like. That is, if hydrocarbons (HC) and the like are present in exhaust gas flowing into a selective reducing catalyst device, the HC components and the like adsorb to pores of zeolite. A metallic component of a selective reducing catalyst device, such as platinum, copper or the like, adsorbs NOx components from exhaust gas at a lean air-fuel ratio. The HC components and the like adsorbed to zeolite surface in a predetermined temperature range, so that the surfaced components react with NOx adsorbed to surfaces of platinum, copper or the like, thereby reducing NOx.

The selective reducing catalyst device needs an appropriate amount of HC components and the like in order to reduce NOx as described above. Therefore, if the amount of HC components and the like adsorbed to the selective reducing catalyst device becomes insufficient, the NOx-reducing rate decreases, so that the NOx concentration in exhaust gas flowing out of the selective reducing catalyst device increases. Therefore, a high NOx-reducing rate of the selective reducing catalyst device can be maintained by disposing an NOx sensor downstream of the selective reducing catalyst device and supplying HC components and the like to the selective reducing catalyst device when the NOx concentration detected by the NOx sensor increases to a predetermined value, as in the case of the NOx-absorbing and reducing catalyst device.

As is apparent from the foregoing description, the internal combustion engine emission control apparatus of the invention is able to detect accurate NOx concentration in exhaust gas even in a case where the NOx sensor output drifts due to deterioration of the senor or the like.

Furthermore, the emission control apparatus of the invention enables an NOx-lessening catalyst device to appropriately lessen NOx in substantially any case by adjusting characteristics of exhaust gas flowing into the NOx-lessening catalyst device on the basis of corrected output of the NOx sensor.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements.

What is claimed is:

1. An emission control apparatus for an internal combustion engine comprising:

an NOx-lessening catalyst disposed in an exhaust passage of the internal combustion engine, the NOx-lessening catalyst lessening an amount of NOx in exhaust gas flowing therein in accordance with a condition of the exhaust gas;

an NOx sensor disposed in the exhaust passage downstream of the NOx-lessening catalyst, an output of the NOx sensor corresponding to an NOx concentration of exhaust gas flowing out of the NOx-lessening catalyst; and a controller monitoring an operational condition of the internal combustion engine and determining a deviation of the output value of the NOx sensor from a predetermined reference value when the engine is being operated under a predetermined operational condition, the controller correcting the output value of the NOx sensor, based on the deviation of the output value from the predetermined reference value.

2. An emission control apparatus according to claim 1, wherein the predetermined operational condition of the internal combustion engine is a condition where the NOx-lessening catalyst is normally functioning, and where NOx discharged from the internal combustion engine is small in quantity.

3. An emission control apparatus according to claim 2, wherein the controller determines that the NOx-lessening catalyst is normally functioning, when the controller determines that a capability of the NOx-lessening catalyst to absorb NOx from exhaust gas is equal to or greater than a predetermined value and that the NOx-lessening catalyst is in a condition under which the NOx-lessening catalyst is able to absorb NOx from exhaust gas.

4. An emission control apparatus according to claim 3, wherein the controller determines whether the NOx-lessening catalyst has deteriorated based on the output from the NOx sensor immediately after reactivation of the NOx-lessening catalyst.

5. An emission control apparatus according to claim 3, wherein the NOx-lessening catalyst is able to absorb NOx from exhaust gas when an air-fuel ratio of exhaust gas flowing into the NOx-lessening catalyst is a lean air-fuel ratio and a temperature of the NOx-lessening catalyst is within a predetermined range.

6. An emission control apparatus according to claim 2, wherein the quantity of NOx discharged from the internal combustion engine is small when the engine is being operated with a low load.

7. An emission control apparatus according to claim 1, wherein under the predetermined operational condition of the internal combustion engine, an NOx-absorbing capability of the NOx-lessening catalyst is equal to or greater than a predetermined value and a temperature of the NOx-lessening catalyst is within a predetermined temperature range and wherein the engine is being operated in one of a low-load, lean air-fuel ratio mode and a sustained fuel cut mode in which a fuel cut mode has continued for a predetermined period of time.

8. An emission control apparatus according to claim 1, wherein the controller controls a condition of exhaust gas flowing into the NOx-lessening catalyst, based on the corrected output value of the NOx sensor, so that the NOx concentration in exhaust gas flowing out of the NOx-lessening catalyst is minimized.

9. An emission control apparatus according to claim 8, wherein the controller controls the condition of the exhaust gas by adjusting an air-fuel ratio of the engine.

10. An emission control apparatus according to claim 8, further comprising a reducer supplier that supplies a reducer into exhaust gas flowing into the NOx-lessening catalyst, wherein the controller controls the condition of the exhaust gas by adjusting an amount of the reducer supplied into exhaust gas.

* * * * *

UNITED STATES PATENT AND TRADEMARK OFFICE
CERTIFICATE OF CORRECTION

PATENT NO. : 6,311,480 B1
DATED : November 6, 2001
INVENTOR(S) : Naoto Suzuki et al.

It is certified that error appears in the above-identified patent and that said Letters Patent is hereby corrected as shown below:

Column 5,
Line 17, change "$O_2^-$ or $O_2^-$" to -- $O_2^-$ or $O^{2-}$ --.
Line 25, after "atmospheres)" insert -- . --.

Column 10,
Line 1, change "falls. immediately" to -- falls. Immediately --.

Column 15,
Line 2, change "Nox-lessening" to -- $No_x$-lessening --.

Signed and Sealed this

Eleventh Day of June, 2002

Attest:

JAMES E. ROGAN
*Attesting Officer*    *Director of the United States Patent and Trademark Office*